United States Patent [15] 3,706,940

Hausner [45] Dec. 19, 1972

[54] HIGH FREQUENCY SWEEP GENERATOR

[72] Inventor: Jerry Hausner, Flushing, N.Y.

[73] Assignee: The Narda Microwave Corporation, Plainview, N.Y.

[22] Filed: Jan. 4, 1971

[21] Appl. No.: 103,779

[52] U.S. Cl. ....................331/76, 321/61, 331/177 R, 331/178

[51] Int. Cl. ....................H03b 23/00

[58] Field of Search ...........331/76, 177, 178; 321/61

[56] References Cited

UNITED STATES PATENTS 3,387,225 6/1968 Wainwright......................331/178 X 3,401,355 9/1968 Kafitz................................331/76 X 3,548,341 12/1970 Berry................................331/76 X

*Primary Examiner*—John Kominski

*Assistant Examiner*—Siegfried H. Grimm

*Attorney*—Robert R. Strack and James A. Eiseman

[57] ABSTRACT

A broad band high frequency sweep generator operating in the gigahertz range. A basic oscillator sweeps a band at the lower region of this range and a frequency amplifier is used to select harmonics for the upper frequencies of the band. Unique amplification and control circuitry is employed to obtain consistent power output and high resolution frequency coverage.

17 Claims, 12 Drawing Figures

INVENTOR
JERRY HAUSNER
BY
Eisenman and Strack
ATTORNEYS

INVENTOR
JERRY HAUSNER

BY
Eisenman and Strack
ATTORNEYS

INVENTOR
JERRY HAUSNER

BY Eisenman and Strack
ATTORNEYS

INVENTOR
JERRY HAUSNER
BY
Eisenman and Strack
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

PATENTED DEC 19 1972 3,706,940

SHEET 08 OF 11

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER

BY
Eisenman and Strack
ATTORNEYS

INVENTOR
JERRY HAUSNER
BY
Eisenman and Strack
ATTORNEYS

HIGH FREQUENCY SWEEP GENERATOR

BACKGROUND OF THE INVENTION

1. Field of the Invention

This invention relates to high frequency generators; and more particularly to high frequency generators controllable to sweep within selected bands of a broad total range.

2. Description of the Prior Art

High frequency signals generators are becoming of increasing importance for both laboratory and commercial application. Such generators operate in the giga-hertz range and preferably provide for controllable sweep throughout some designated band. It has been found that the entire sweep range desired very often requires the utilization of more than one oscillator and associated circuitry. It is also necessary to obtain considerable power output from such generators and, in general, the art has turned to the backward wave oscillator in order to obtain the desired power output. To date, there has been no successful development of solid state circuitry capable of providing the many characteristics required of such units.

Partially as a result of the use of the backward wave oscillator and the attendant circuitry, including the power supplies required in conjunction therewith, broadband high frequency generators have required a great deal of power and have also taken considerable space due to their necessary size and weight.

SUMMARY OF THE INVENTION

The present invention provides a conveniently packaged broadband high frequency generator utilizing solid state circuitry throughout.

It is an object of the present invention to provide an improved broadband high frequency generator.

It is another object of the present invention to provide a high frequency generator capable of sweeping from 1.0 to 12.4 GHz, or any part thereof, either up or down in frequency.

It is another object of the invention to provide a broadband high frequency generator wherein all settings are continuously and independently adjustable over the entire frequency range.

It is another object of the invention to provide a solid state broadband high frequency generator.

It is another object of the present invention to provide a broadband high frequency generator capable of effecting a symmetrical sweep centered on any of several selected center frequencies.

It is another object of the present invention to provide a broadband high frequency generator having marker means for marking frequencies which are independently adjustable over the entire frequency range.

It is another object of the present invention to provide a pushbutton control unit wherein one may select frequencies to be swept by the actuation of selected pushbuttons.

It is another object of the present invention to provide a digital display and selection control of the frequencies available in connection with either continuous wave outputs or band sweeping outputs.

The features of the present invention include the utilization of a single oscillator sweeping a relatively narrow band of frequencies in combination with a frequency multiplier which utilizes the harmonics of the initial frequencies to develop a broader band.

Another feature of the present invention relates to means for utilizing such a single oscillator and frequency multiplier combination which provides a smooth transition between sweep regions as the oscillator returns to its starting point.

Still another feature of the invention relates to the provision of means for matching the frequency multiplier to the oscillator during the sweep.

By the utilization of a digital data presentation, one is able to avoid the compressed scale phenomena necessarily encountered when one utilizes, or attempts to utilize, a linear scale presentation of the frequencies developed over a broad band. Still another feature of the invention relates to means for digitally presenting frequency data in order to afford maximum resolution of this data and complete control thereover.

Another feature of the invention relates to the utilization of a pushbutton control for function and frequency selection which insures the exclusive and accurate selection of particular generator functioning modes and also insures in connection with this function selection the proper frequency selection from a plurality of control options.

In accordance with the invention, there is provided a high frequency sweep generator using oscillating means to sweep an initial frequency band and multiplier means operative to select harmonics of the frequencies in the initial band for sweeping a higher frequency band or bands. The generator comprises means for tuning the oscillating means and the multiplier means in response to direct current voltage levels discretely indicative of a frequency desired, means for establishing a plurality of voltage levels, first means for selecting one of the voltage levels for tuning the generator to the single frequency corresponding thereto, second means for selecting one of the voltage levels for tuning the generator to sweep a frequency band centered on the frequency corresponding thereto, and third means for selecting two of the voltage levels for tuning the generator to sweep a frequency band between the frequencies corresponding thereto.

In accordance with one aspect of the invention, the frequencies are selected by indexed devices arranged to take one step for selection of each decimal digit of a chosen frequency. These devices also visually display the value of the digit selected and consequently display the chosen frequency in decimal form.

The above, as well as additional objects and features of the invention, will be more clearly understood and appreciated from the following discussion which is made in conjunction with the attached drawings.

DESCRIPTION OF THE PREFERRED EMBODIMENT

General Description

Figure 1:
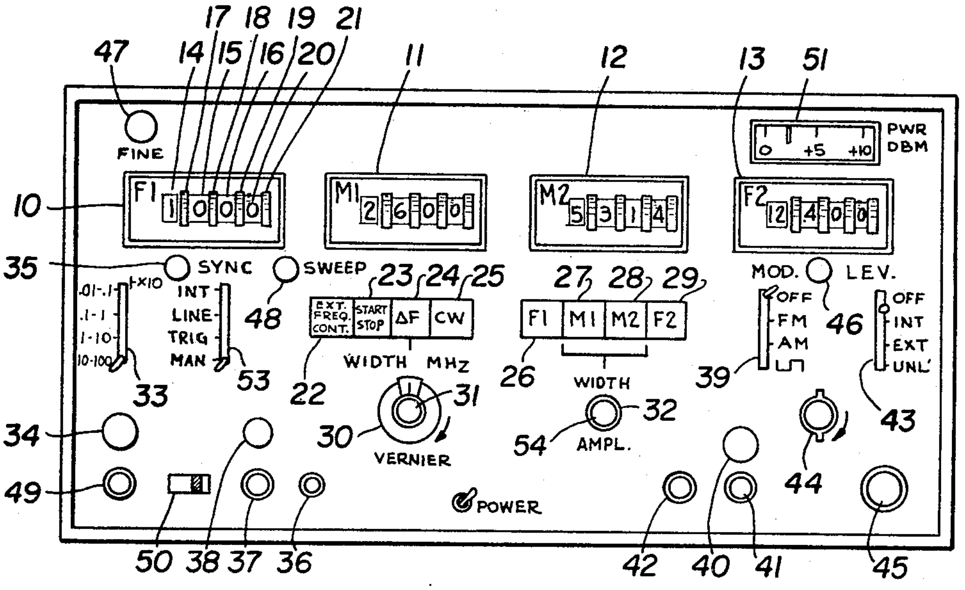
FIG. 1 is an illustration of the control panel of a broadband high frequency sweep generator embodying the features of the present invention.

Before proceeding with a consideration of circuit schematics which illustrate specific circuitry for effecting the more salient features of the present invention, a consideration of the front panel on a unit embodying the invention will be of value. Such a front panel is illustrated in FIG. 1. While reviewing the components appearing on this panel, it will be possible to described the functions controlled thereby.

Four digital display windows, 10, 11, 12, 13, are horizontally disposed across the upper portion of the unit shown in FIG. 1. Behind one of the four apertures of each display window there are indicator cylinders having decimal digits on the circumference. In each position of these cylinders, one digit appears in the associated aperture. The cylinders, e.g., 14, 15, 16, representing the three most significant digits, are controlled by indexed thumb wheels, e.g., 17, 18, 19. On cylinder 14, any one of twelve digits may be selected, and on cylinders 15 and 16, any one of ten digits may be selected. The cylinder, e.g., 20, representing the least significant digit appears on the right of each display and is a fine adjustment that is controlled by a thumb wheel, e.g., 21, in analog fashion to yield high resolution. As will be appreciated more clearly hereinafter, each thumb wheel controls a voltage divider network which establishes a direct current voltage level commensurate in magnitude with the digit selected. The number appearing in the windows represents a frequency setting, and the thumb wheels are the manual means for setting the desired critical frequencies.

The window 10 on the left contains the F1 Digital Frequency Selector which is a digital counter that sets and displays the start frequency when operating in the START/STOP mode, the center frequency when operating in the ΔF mode, or the operating frequency when operating in the CW (continuous wave) mode.

The second window 11 from the left contains the M1 Digital Frequency Selector which is a digital counter that sets and displays one of the marker frequencies, or either the start or stop frequency when operating in the START/STOP mode; the center frequency, or one of the marker frequencies, when operating in the ΔF mode; or the operating frequency when operating in the CW mode.

The third window 12 from the left contains the M2 Digital Frequency Selector and functions in the same manner as the M1 Digital Frequency Selector for a second marker. The fourth window 13 on the right contains the F2 Digital Frequency Selector which functions in the same manner as the F1 Selector with the exception that it displays the stop frequency when the equipment is operating in the START/STOP mode.

The preferred embodiment illustrated herein is capable of operation in any one of four discrete modes. The operating mode is selected by depressing one of the four Function Selection Pushbuttons 22, 23, 24, or 25, at the center of the panel.

Pushbutton 22, designated "Ext. Freq. Cont.," activates the system to operate in response to an external frequency control. When this mode is selected, the internal frequency selecting elements of the equipment are not used.

When the "START/STOP" pushbutton 23 is activated, the system operates to produce a sweep frequency output varying between two extremes determined by any two actuated pushbuttons 26-29 in the adjacent Frequency Selection array. The direction of the sweep will be either up or down the frequency spectrum in accordance with whether or not the left-most Frequency Selector pushbutton is set to a lower or higher value, respectively.

When the "ΔF" pushbutton 24 is actuated, the system operates to sweep a band about the center frequency determined by the actuated one of the four Frequency Selection pushbuttons 26–29. When in the ΔF operating mode, one may arrange for sweeping about four independent center frequencies nd establish the particular frequency used at any one time, by appropriate setting of the Digital Frequency Selectors. The particular frequency to be used is then selected by actuation of the Frequency Selector pushbuttons. The width of the band swept during the ΔF operating mode, is determined by one of the coaxial control elements 30, 31. This is a dual knob control providing an indexed element 30 for selecting, for example, one of four sweep bands between 0.1 and 100 MHz; and a rotatable vernier control 31 which varies the band width within the selected range.

When continuous wave operating mode is initiated by actuation of the "CW" pushbutton 25, the system operates to provide a continuous frequency output at any one of the frequencies selected by actuation of the Frequency Selector Pushbuttons 26–29.

As noted above, the Frequency Selection Pushbuttons 26–29 are used to choose the Digital Frequency Selector to be employed in a particular operation. It will be noted that each of these pushbuttons bears a designation corresponding to one of the Digital Display controls, F1, M1, M2, or F2. The F1 pushbutton 26 is used to select the start frequency when operating in the START/STOP mode; to select the center frequency in the ΔF mode; or to select the operating frequency in the CW mode. The particular frequency selected is the one designated in the F1 display window 10. The M1 pushbutton 27 selects one of the marker frequencies; either the start or stop frequency in the START/STOP mode; the center frequency in the ΔF mode; or the operating frequency in the CW mode. The particular frequency selected is the one designated in the M1 display window 11. The M2 and F2 pushbuttons 28 and 29, similarly control the selection of the frequencies designated in the M2 and F2 display windows 12 and 13, respectively.

The width and amplitude of the marker pulses are controlled by the dual knob coaxial control 32, 54.

Four other important controls appear in FIG. 1 and are used to establish operating characteristics of the illustrative embodiment. These controls concern the time required to sweep a selected band, synchronization of the circuitry, introduction of a modulation component onto the output, and levelling of the output.

Selection of the sweep time is effected via a sweep time lever 33 which controls switching to select one of four possible sweep ranges extending from 0.01 – 0.1 secs. to 10 – 100 secs. A vernier dial 34 provides manual control for varying the sweep time within the range selected. It may also be noted that an indicator lamp 35 is provided for automatic illumination when the unit automatically increases the sweep time by a factor of 10 as a result of sweeping too wide a frequency range for proper operation by the equipment.

The unit illustrated in this preferred embodiment may be synchronized internally, to the line, or by an external trigger in accordance with the position of the synchronizing lever 53 which controls appropriate switching for each condition. In the "INT" position, the sweep is automatically internally synchronized. In the "LINE" position, the sweep is synchronized to the line voltage. In the "TRIG" position, the sweep may be initiated by actuation of a pushbutton switch 36, or from an external source via input jack 37. One may also manually sweep a selected range by placing lever 53 in the "MAN SCAN" position and actuating the rotary control 38.

Modulation lever 39 provides means for selecting the desired modulation, whether it be an external FM or AM modulation, an internal square wave, or no modulation at all. Rotatable knob 40 provides the means for varying the frequency of the internal square wave generator within a selected range, in the present case, 800 to 1,200 Hz. Connector jacks 41 and 42 are simply utilized as means for accepting a levelling signal from an external crystal detector, or external modulating signals respectively.

Modulation control lever 43 offers the means for selecting a levelled or unlevelled mode of operation, or for removing the radio frequency signal. Levelling may be effected either externally or internally, and indicator lamp 46 will automatically illuminate whenever the power is not level across a selected frequency band. Rotatable knob 44 controls an attenuator and permits adjustment of the radio frequency amplitude or the switching to an external amplitude control. Connector jack 45 furnishes a radio frequency output.

Additional elements of interest on the unit shown in FIG. 1, include: rotatable knob 47 which controls a variable impedance to achieve fine resolution of the F1 frequency when in the CW operating mode; indicator lamp 48 which is illuminated during frequency sweeping; connector jack 49 which provides a horizontal sweep output for display use; retrace slide switch 50 which provides for automatic blanking of the radio frequency signal during retrace; and power DBM meter 51 which indicates calibrated power output.

With a general understanding of the controls which may be effected with equipment embodying the features of this invention, it will now be possible to discuss in detail the various circuits used to effect these controls.

Figure 2:
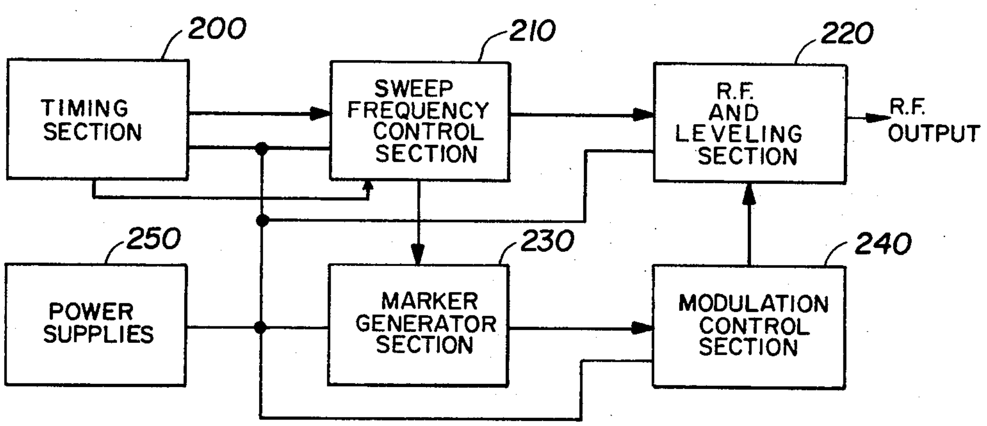
FIG. 2 is a general block diagram of the basic sections of a frequency sweep generator embodying the features of the present invention.

The equipment may be considered to comprise six distinct sections: a Timing Section 200, a Sweep Frequency Control Section 210, a Modulation Control Section 240, a Radio Frequency and Levelling Section 220, a Marker Generator Section 230, and a Power Supply Section 250. The relationship between each of these basic sections is shown in FIG. 2.

Timing Section 200 contains the basic rate or frequency generator which controls the start of a ramp signal. It also contains high and low limit detectors, the first of which senses the end of a retrace cycle to insure that a new sweep cannot be initiated until the preceding sweep has completed its retrace cycle. The low limit detector senses the end of a new sweep and initiates the retrace cycle of a Miller Integrator to start it back to its positive saturation voltage. This will be discussed in more detail hereinafter.

Sweep Frequency Control Section 210 generates a ramp voltage between levels determined by the START/STOP frequency settings on the F1 and F2 Digital Frequency Selectors. Thus, for example, if F1 is set to 1.000 GHz and F2 is set to 12.400 GHz, the ramp generated would be 1.000 to 12.400 volts. When the sweep time lever 33 is set in the 0.01 – 0.1 second position, as explained hereinafter, an over-ride relay is provided to slow the sweep time by a factor of ten, if the sweep width exceeds the limitations of the sweep time.

When operating in the CW mode, the ramp voltage is replaced by a direct current voltage equal to the setting of the Digital Frequency Selector being used. When operating in the ΔF mode, a small ramp is superimposed on the CW direct current voltage. The superimposed ramp is then adjustable by means of control 30, 31.

Marker Generator Section 230 samples the ramp voltage and generates marker pulses at the frequency selected on the Digital Frequency Selectors M1 and M2. As previously noted, provision is made for controlling the width and amplitude of the marker pulses.

Modulation Control Section 240 includes a summing amplifier which sums the external or internal modulation and the frequency markers and provides the result to the Radio Frequency and Levelling Section 220.

The Radio Frequency and Levelling Section 220 is operative to sample the ramp voltage and drive a basic yig-tuned radio frequency oscillator. The output of the oscillator is then supplied to a diode switch which provides the control for radio frequency modulation, radio frequency amplitude control, and levelling capability. In accordance with the operation selected, a directional detector or an external detector will feed a leveller amplifier which activates a diode switch driver to drive the diode switch. Switchpoint blanking is generated at the switchover point from one harmonic of the radio frequency oscillator frequency to another, and this is generated in coincidence with the switchover time dwell.

Power Supply Section 250 operates to provide all necessary supply and biasing voltage. These voltages are subjected to the filtering required. Because the present invention uses all solid state components, the amount of power required is considerably less than that used by prior art equipment having comparable output capacity.

Figure 3:
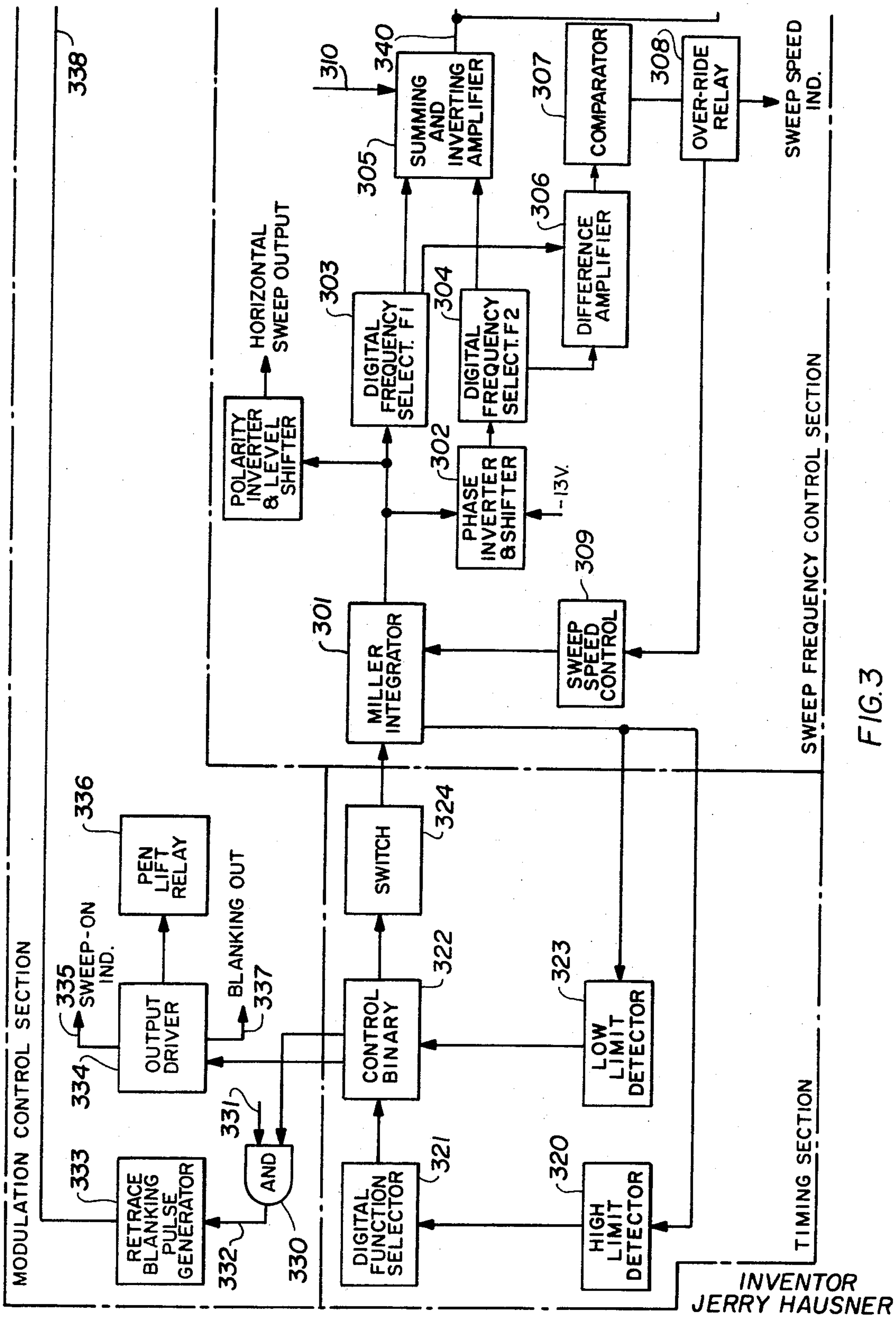
FIGS. 3 and 4, when placed side-by-side, constitute a more detailed block diagram of the major components of a frequency sweep generator embodying the features of the present invention.
Figure 4:
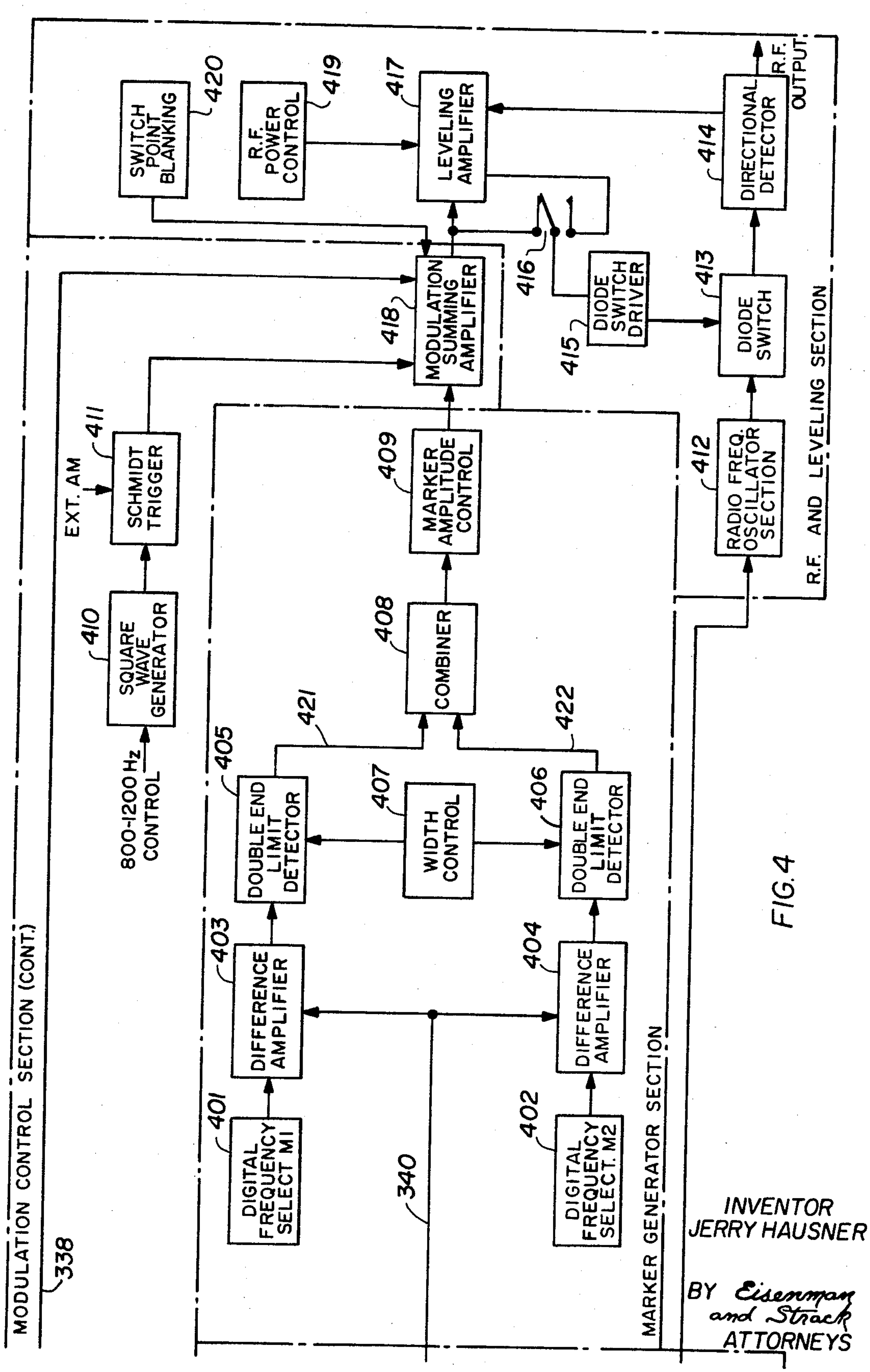

A more complete consideration of the contents of the various sections may be had by consideration of the more detailed block schematic presented in FIGS. 3 and 4. These figures should be positioned adjacent to one another with FIG. 3 on the left. In this block schematic, the sections referred to in connection with FIG. 2 are delineated by means of dash-dot lines.

The Sweep Frequency Control Section is disposed across the right hand portion of FIG. 3. It will be seen to include a Miller Integrator 301 which generates the basic ramp signal for sweep control. In the particular embodiment shown, the ramp descends from +13 to zero volts. This ramp is applied to a Phase Inverter and Shifter 302 which changes it to one varying from zero to +13 volts. The positive ramp is then applied to a voltage divider associated with the F2 Digital Frequency Selector, designated by block 304. The output of Miller Integrator 301 is also applied directly to the voltage divider associated with the F1 Digital Frequency Selector, designated by block 303. The outputs of the F1 and F2 Frequency Selectors are both supplied to a Summing and Inverting Amplifier 305 and to a Difference Amplifier 306. Summing and Inverting Amplifier 305 may also receive an external frequency on lead 310.

The output of Summing and Inverting Amplifier 305 is a ramp voltage which is commensurate with the start/stop frequency settings on the F1 and F2 Digital Frequency Selectors. Thus, for example, if F1 is set to 1.000 GHz and F2 is set to 12.400 GHz, the ramp generated would be −1.000 to −12.400 volts. On the other hand, if F1 is set to 3.000 GHz and F2 is set to 6.700 GHz, the ramp generated would be −3.000 to −6.700 volts. Difference Amplifier 306 samples the output ramp produced by both the F1 and F2 Digital Frequency Selectors and compares the difference with a reference sweep width via a Comparator 307. In the event that the sweep width exceeds the limitations of the sweep time established by the controls, an Override Relay 308 is actuated to introduce Sweep Speed Control 309 and thereby increase the sweep time by a factor of 10. As described in full hereinafter, Override Relay 308 functions only when Sweep Time lever 33 selects the 0.01 to 0.1 second sweep time range.

The Timing Section occupies the lower left quadrant of FIG. 3. In this Section, the Sync and Sweep Mode control are combined with the output of a High Limit Detector 320 that is operative to detect the end of a retrace. This combining takes place in a logic NAND gate forming part of Digital Function Selector 321 and it insures that a new sweep is not initiated until the preceding sweep has completed its retrace cycle. The output of the NAND gate is applied to a Control Binary flip-flop circuit 322 which supplies an output to a logic AND gate 330 in the Modulation Control Section. The flip-flop in Control Binary 322 is also driven by a Low Limit Detector 323 which detects the end of a sweep. The Low Limit Detector 323 causes Control Binary 322 to close a switch at the Miller Integrator ramp generator in order to start the ramp generator retrace cycle back to a positive saturation voltage.

The Marker Generator Section is illustrated on the left side of FIG. 4. The M1 and M2 Digital Frequency Selectors produce voltages developed by voltage dividers which are commensurate with the desired frequencies. A Difference Amplifier 403 sample the ramp voltage supplied on lead 340 from the Summing and Inverting Amplifier 305 and subtracts it from the reference voltage generated by the M1 Digital Frequency Selector 401. The resultant shifted sawtooth signal is then fed to a Double End Limit Detector 405 which acts as a comparator that is centered at zero volts, and produces an M1 marker pulse on lead 421. Pulse Width Controller 407 is the adjustable width control potentiometer 32 which sets the voltage between the Detector end limits. The M1 marker pulse is then fed through a Combiner 408 and Amplitude Controller 409 to the Modulation Summing Amplifier 418. Amplitude Controller 409 is adjusted by front panel amplitude potentiometer 33 which establishes the pulse amplitude.

The output from the M2 Digital Frequency Selector 402 is compared in a second Difference Amplifier 404 with the ramp signal on lead 340 in order to generate a shifted sawtooth signal which is then applied to a second Double End Limit Detector 406. As described with respect to the voltage from the M1 Digital Frequency Selector, Limit Detector 406 generates an appropriately positioned M2 marker pulse on lead 422, having its width controlled by Width Controller 407. This second marker pulse is then combined with the first pulse in Combiner 408 and it is amplitude modified prior to application to Summing Amplifier 418.

When there is to be pulse modulation, either internally or externally initiated, the markers are combined in Modulation Summing Amplifier 418 with the modulating signal. When internal square waves modulation is employed, a Square Wave Generator 410 produces a square wave output having a frequency determined by the setting of the control potentiometer 40. This output supplies Modulation Summing Amplifier 418 via a Schmidt Trigger Circuit 411. When external amplitude modulation is to be utilized, it is introduced directly to Schmidt Trigger Circuit 411.

Retrace blanking is effected by means of the previously mentioned AND gate 330 which receives inputs from Control Binary 322. The output of the AND gate 330 is amplified and balanced to zero volts and then applied on lead 338 to Modulation Summing Amplifier 418 via a Retrace Blanking PUlse Generator 333. The AND gate 330 inputs are from the EXT FREQ CONT and CW pushbuttons 22 and 25. The "MAN SCAN" position of lever 53 removes the blanking voltages. An additional output from the Control Binary 322 goes to an Output Driver 334 which is utilized to control the sweep-on indicator lamp 48, provide a blanking output on lead 337, and for pen lift relay operation at block 336.

The radio Frequency and Levelling Section shown on the right side of FIG. 4, includes the RF Oscillator Section 412 which feeds its output to Diode Switch 413. Diode Switch 413 feeds a Leveler Amplifier 417 via an optional Directional Detector 414 during levelled operation, and provides the control for RF modulation, RF amplitude control, and the levelling capability. As illustrated, the output of Diode Switch 413 may be fed directly through the Directional Detector 414 to an RF output connector. Diode Switch 413 is controlled by a Driver 415 associated with a relay 416 which allows the signal from the Modulation Summing Amplifier 418 to by-pass levelling amplifier 417, when desired, to provide faster rise time during operation in an unlevelled mode.

At the switchover point from one harmonic of the RF oscillator frequency to another, blanking is generated in the RF section by means of the Switchpoint Blanking unit 420. A 12 millisecond pulse blanks the RF frequency while RF oscillator 412 is returning to its lowest fundamental frequency. This blanking pulse is generated in coincidence with the switchover dwell time.

DETAILED DESCRIPTION

With a general understanding of the various circuits and their interconnections, it is now possible to consider the more detailed circuit schematics of pertinent features. It will be appreciated that these schematics are presented for illustrative purposes only. There is no intention, unless specifically limited by the claims, of restricting the invention to the particular circuit connections or components shown. Still further, there is no intention to illustrate in the circuit schematics, every possible component or portion of the embodiments discussed hereinbefore. The circuit diagrams are presented for the purpose of showing in detail a preferred embodiment of the various pertinent features of this invention. Modifications will be immediately apparent to those skilled in the art and where not specifically germane to the invention, these modifications would be considered to be embraced by the present disclosure.

In order to make it easier to follow the discussion of the various FIGURES presented herewith, several conventions have been adopted. In general, the elements have been illustrated in accordance with standard industry practices. When believed helpful, actual values have been shown for voltages and impedances. In addition, the elements have been given alpha-numeric designations wherein the alphabetic portion suggests the type of element and the numeric portion indicates the particular element involved. For example, the letters R, C, Q, and IC denote resistors, capacitors, transistors, and integrated circuits, respectively. Where possible, the numbers used employ the FIGURE number as the hundreds digit. For example, element R510 is a resistor appearing in FIG. 5.

RADIO FREQUENCY SECTION

The embodiment of the present invention utilizes two "YIG" tuned devices as the basic signal generating components. As well known, these devices will produce a critically tunable frequency output determined by the magnitude of direct current control voltage. A first such "YIG" device serves as the basic oscillator which sweeps a frequency range of from 1 GHz to 2 GHz. A second such device is employed as a frequency multiplier and operates to tune the output for selection of desired harmonics. Where the total range desired is 1 GHz to 12.4 GHz, the second, third, fifth, and seventh harmonic components of the basic frequency may be advantageously selected. The total output range is thus a composite made up of the basic range and selected portions of each harmonic.

Figure 5:
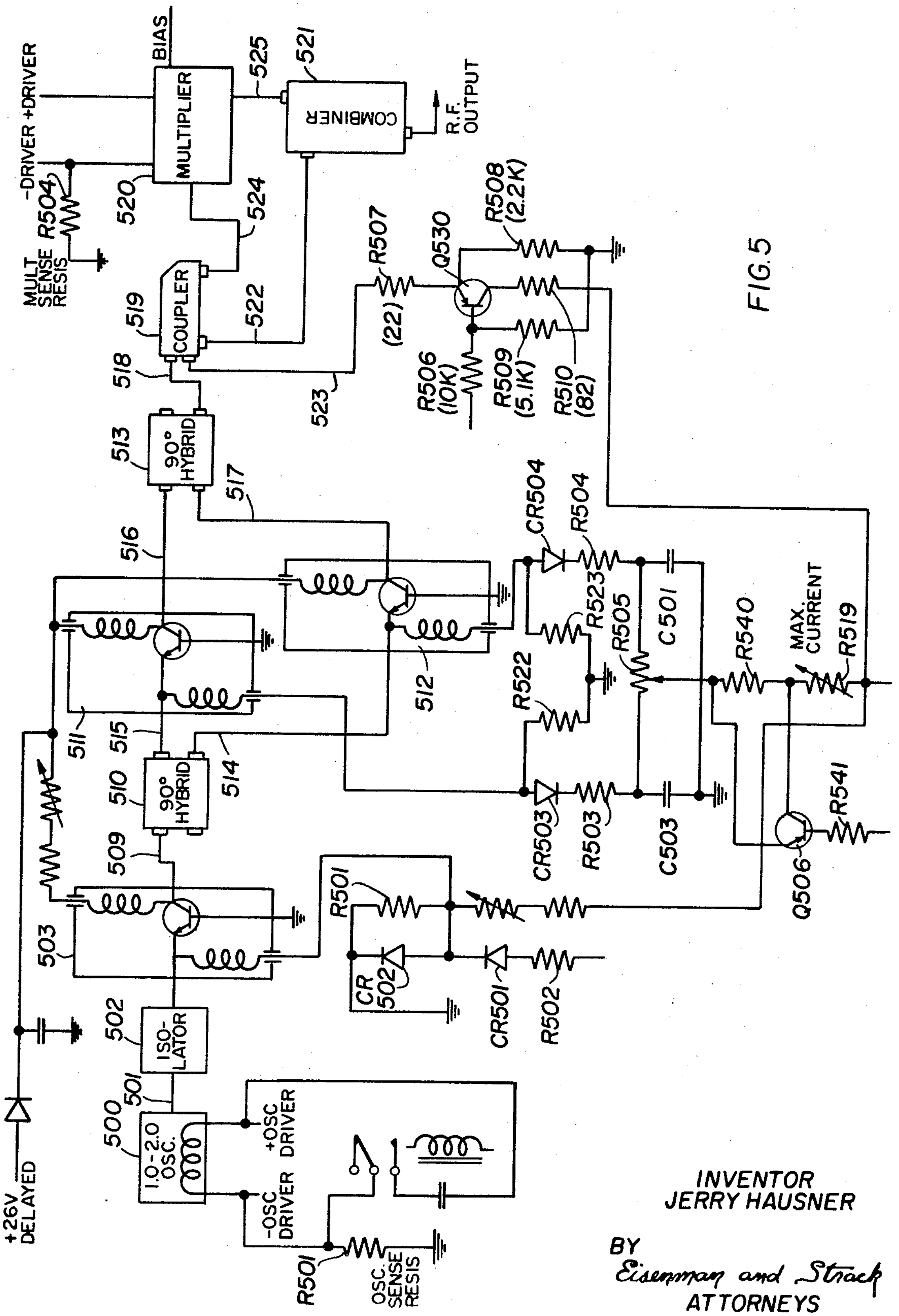
FIG. 5 is a combined block and circuit schematic diagram of the radio frequency section of a frequency sweep generator embodying the features of the present invention.

A general appreciation of the functioning of the Radio Frequency Section of a particular embodiment may be obtained by consideration of FIG. 5. The basic Oscillator 500 generates an output sweeping in frequency from 1 GHz to 2 GHz under the control of an Oscillator Driver. The Oscillator Driver 602 is illustrated in block form in FIG. 6. The output of Oscillator 500 is applied over lead 501 to an Isolator 502 and thence into Transistor Amplifier 503.

It is an important feature of the present invention that the power be maintained at a good level throughout the entire frequency range produced. To do this, it is essential that the R.F. switching networks and each of the operating components be properly designed and matched. Heretofore, difficulty has been encountered in connection with constant gain amplification over a broad frequency range. The hybrid and dual transistor amplifier network supplied by the output of Amplifier 503, is particularly valuable in effecting broad band amplification at a high level.

The amplification network includes Hybrids 510 and 513, and Transistor Amplifiers 511 and 512, interconnected as shown. R. F. power is applied to the amplifier stages from Amplifier 503, via 90° Hybrid 510. One half of the power is in phase with the input on line 509 and it is applied to Amplifier 511 on lead 515. The other half of the power is 90° out of phase with the input on lead 509 and is applied via lead 514 to Amplifier 512. The Amplifiers 511, 512 are similarly designed and consequently have approximately equal reflection characteristics. The reflection from Amplifier 511 is passed back on lead 515 and Hybrid 510 in phase with the input. The reflection from Amplifier 512, however, experiences a 90° phase shift when passed back over lead 514 and Hybrid 510. Thus, the reflections from the two Amplifiers arrive at input lead 509, 180° out of phase, with the result that they substantially cancel each other out and, in so doing, create a good input match between Amplifier 503 and Hybrid 510.

The outputs of Amplifiers 511 and 512 are directed via leads 516 and 517, respectively, to the second 90° Hybrid 513. There is no phase shift in the Amplifiers and therefore the signal produced on lead 516 is in phase with the input power and the signal produced on lead 517 is 90° out of phase. The power on lead 516 experiences a 90° phase shift as it goes through Hybrid 513 and this phase shift then places it back in phase with the power delivered via lead 517 from Amplifier 512. Thus, the amplified outputs from Amplifiers 511 and 512 have been combined in phase on lead 518.

In the same general manner explained in connection with the reflections back to the input via Hybrid 510, the combination of Hybrid 513 and Amplifiers 511 and 512 will result in cancellation of reflections from the output. This creates a good match between Hybrid 513 and the succeeding L-Band Coupler 519.

Having effected the desired amplification of the basic Oscillator output which produces a frequency sweep ranging from 1 GHz to 2 GHz, one portion of the output is applied through L-Band Coupler 519 to a YIG tuned Multiplier 520. A second smaller portion of the output is taken from L-Band Coupler 519 via lead 522, directly to a Combiner 521. The signal on lead 524 is passed through Multiplier 520 to select the appropriate harmonics for the desired output. As understood by those skilled in this art, YIG tuned Multiplier 520 effects selection of the desired harmonics on its input in accordance with the direct current drive voltages applied. The output from Multiplier 520 is applied directly to a Combiner 521 and thence to the R.F. output.

The reason for the second path from L-Band Coupler 519 to Combiner 521, lies in the fact that it has been found advisable to obtain the output directly, over the principal range of 1 GHz to 2 GHz. Thus, when the output is to be within this initial range, the switching circuit built around transistor Q530 controls Coupler 519 on lead 523 to pass the signal via lead 522. Within the range 2 GHz to 12.4 GHz, the signal is passed via lead 524 to the Multiplier.

The additional circuitry appearing in FIG. 5 operates in the manner known per se with the basic components discussed. It is included in the interest of completeness and its functioning will be apparent to those skilled in the art.

SWEEP DWELL DURING HARMONIC SWITCHING

As mentioned above, when utilizing a basic sweeping oscillator on a basic frequency band and selecting harmonics of the basic frequencies for higher bands, it is essential to consider the recycling time of the basic oscillator and provide means for ameliorating the discontinuities created during the recycling. Without such means, a portion of the band is lost because of the finite time required for the oscillator to return to its lower frequency. Furthermore, if the tuning of the Multiplier is not coordinated with the retrace interval, by the time the basic oscillator has reached its initial position, the tuning drive on the Multiplier circuit will have passed beyond its starting point. As one aspect in the solution of these problems, a system has been devised to halt advancement of all voltages and sweep signals within the generating unit, during the time it takes the oscillator to return to its lower frequency.

In order to effect the desired switching to different harmonics, the tuning ramp control voltage is monitored. This voltage, in the illustrative embodiment, has been established as varying from −1.000 Volt to −12.4 Volts over the complete frequency range. The monitoring is carried out in a plurality of comparators which produce discrete outputs when the ramp reaches the particular levels at which the various harmonics are to be utilized. These outputs are then employed to control attenuating networks that adjust the slope and starting level of the ramp control signal that is applied to the oscillator driving circuitry.

Figure 6:
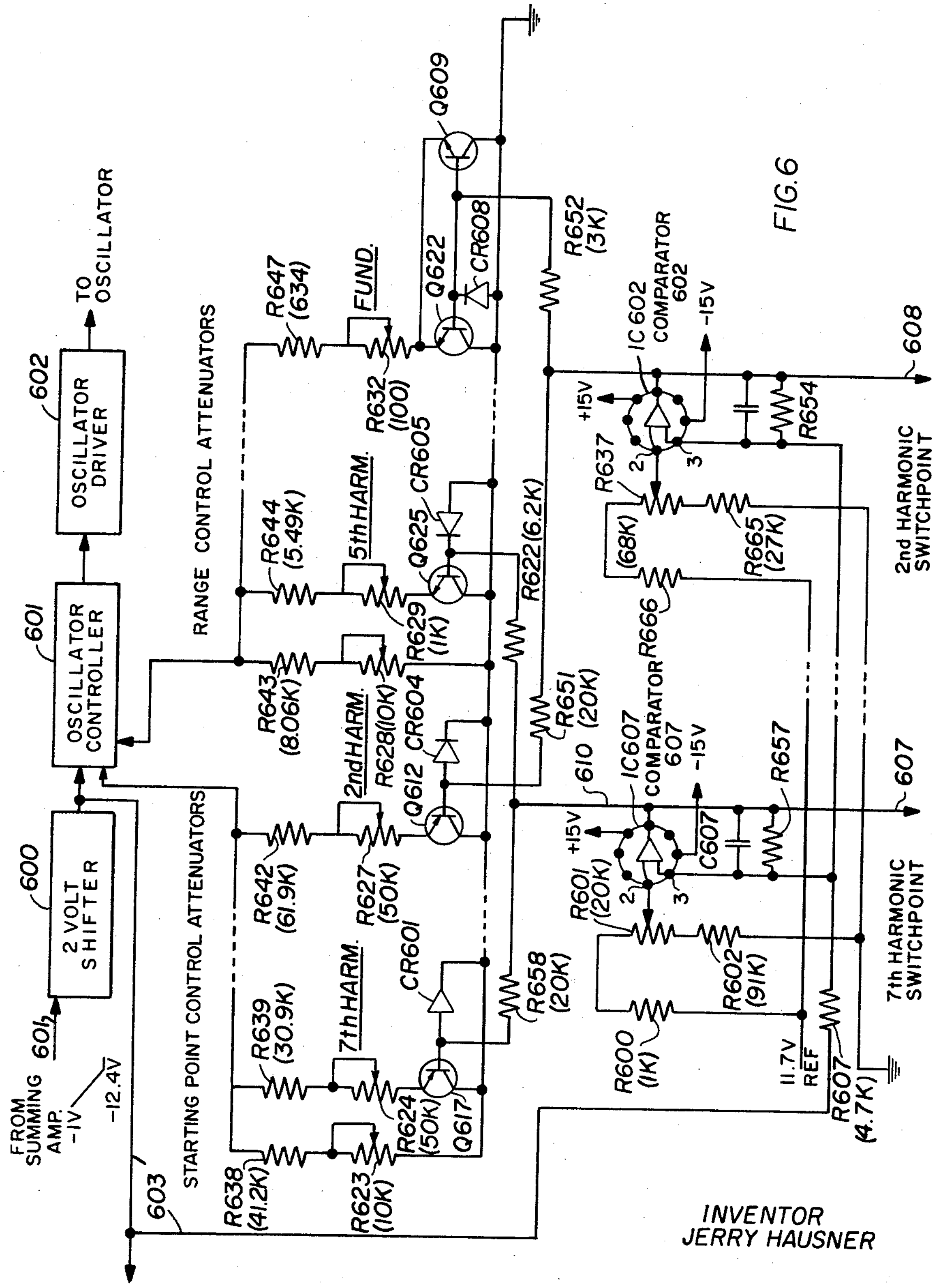
FIG. 6 is a combined block and circuit schematic diagram illustrating oscillation control circuitry in a frequency sweep generator embodying the features of the present invention.

In FIG. 6, two typical Comparator Circuits 607, 602 are shown. These circuits control the switching to the seventh and second harmonics, respectively. Similar circuits are used for controlling switching to the fifth and third harmonics. The output from the Comparators controls the Starting Point Attenuators built around transistors Q617, Q612 and the Range Attenuators built around transistors Q625, Q622, Q609; which in turn appropriately modify the ramp control signal applied to the Oscillator Driver 602 via Oscillator Controller 601.

FIG. 6 also contains a Two Volt Shifter 600. This circuit is used to shift the initial tuning ramp two volts down in order to accommodate the characteristics of the various circuit elements used in this particular embodiment. The input to Two Volt Shifter 600 of principal interest, is the tuning ramp on lead 604. This input is shifted and presented as an output on lead 603 that appears as a ramp of negative slope ranging from −3.000 Volts to −14.4 Volts.

Each of the Comparators receives the ramp on lead 603 as one input, and a reference value as a second input. Consider Comparator 607 as a typical example. Comparator 607 is developed around integrated circuit IC607. Appropriate supply, biasing, and external circuitry is provided and the inputs to be compared are applied to terminals 2 and 3. Thus, the ramp is applied to terminal 3 via a resistor R607, and a reference voltage is applied to terminal 2 via a variable impedance network including resistance R600, R601, and R602, connected as a voltage divider between an 11.7 Volt reference and ground. Resistance R601 is connected as a potentiometer with the slide connected to terminal 2 of IC607.

The Range Control Attenuators comprise transistor switches, e.g., Q627, Q622 that are selectively operated by the output of the Comparator with which they are associated to decrease the tuning rate as the higher harmonics are switched in. Thus, the oscillator is initially tuned at a rate of 1 GHz per volt of the tuning ramp; during the utilization of the second harmonic it is tuned at a rate of 0.5 GHz per volt of the tuning ramp; during the third harmonic it is tuned at a rate of 0.33 GHz per volt of the tuning ramp; etc. The impedances controlled by the transistor switches of the Range Control attenuators increase in magnitude as the harmonic increases.

The Starting Point Control attenuators adjust the direct current reference in the Oscillator control loop in order to establish the starting frequency of the Oscillator as each harmonic is switched in. Here too, each harmonic is repesented by a transistor switch, e.g., Q617, Q612, in series with a variable resistance. It will be noted that as the harmonics increase, the magnitude of the resistance decreases. If the second harmonic is to be switched in at exactly 2.000 GHz, the Oscillator must return to exactly 1.000 GHz to commence the second harmonic sweep. If the third harmonic is to be switched in at exactly 3.000 GHz, the Oscillator must again return to exactly 1.000 GHz to commence the third harmonic sweep. Actually, it is found in practice that the switchpoints may advantageously be at locations other than precisely 2.000 GHz, 3.000 GHz, 5.000 GHz, and 7.000 GHz. Each switch-point is selected for the best overall system performance by adjusting the reference voltage to the Comparators at Potentiometers R601, etc.

The single output of each Comparator controls the associated transistor switches in both the Starting Point attenuator and the Range Control attenuator, because these latter circuits utilize PNP and NPN transistors, respectively. Thus, the same polarity output signal from the Comparator is effective to turn-on one transistor and turn-off the other, causing the switches to sequentially change the resistance in parallel available to the oscillator.

With a general understanding of the harmonic selection circuitry of FIG. 6, the consideration of blanking during retrace may resume. The output of each Comparator is connected via a differentiating network to the monostable multivibrator shown in FIG. 7. For example, the output of Comparator 607, appearing on lead 607, is connected through Resistor R701, Capacitor C701, and either diode CR701 or CR702, to the base of the transistor Q701 or Q702, which make up the monostable multivibrator. The differentiating network converts the step function output of the Comparator into either a positive or negative pulse, depending upon whether the frequency is being swept upwards or downwards. Diodes CR701 and CR702 are individual elements in a pair of separate OR gates which function to direct triggering pulses to the monostable multivibrator from each of the Comparators.

More specifically, during a sweep, negative pulses will be formed while sweeping upward in frequency and positive pulses will be formed while sweeping downward in frequency. The output of each OR gate is either a positive or negative pulse in accordance with the direction of sweep. In accordance with well-recognized multivibrator operation, these pulses trigger the multivibrator and thereby develop a negative output pulse on lead 701. In the particular embodiment being discussed, this output pulse has a duration of approximately 12 milliseconds. The output of the monostable multivibrator is used as the control voltage for the basic Miller Integrator Sweep circuit illustrated on FIG. 8.

As well appreciated, a Miller Integrator circuit provides a linear ramp voltage in response to an applied constant direct current charging voltage. In the present case the charging voltage on lead 701 causes the integration to proceed under normal circumstances and stop only during the 12 millisecond blanking period. In other words, at the switching point between each harmonic selection, there will be a 12 millisecond blanking interval. The output from the Miller Integrator is the main ramp from which all other circuits are tuned and consequently by interrupting this ramp there is no advancement or change in any of the other circuitry. If an oscilloscope is being used to monitor the operation of the generator, the horizontal sweep of the oscilloscope would also utilize this ramp and accordingly in viewing the output of the sweeper, one might note an increase in intensity of the sweep during these 12 millisecond blanking intervals. Obviously, there would be no horizontal displacement of the sweep during these intervals inasmuch as the voltage is not changed. The output of the multivibrator is also utilized if desired to control the RF signal output and during the blanking interval the RF signal may be completely blocked in order to eliminate the possibility of generating unwanted spurious signals during that time. Such signals might occur, for example, because the oscillator in its fly-back will necessarily hit sub-multiples of the frequency to which the multiplier is tuned.

COMPENSATION FOR MULTIPLIER LAG

It has been found that in circuits using a Multiplier to select harmonics of a basic frequency that is being continuously swept, the Multiplier does not track properly at the higher sweep rates, for example, above 80 GHz per second. At increasing higher sweep rates, the Multiplier tends to lag by larger and larger amounts. To compensate for this characteristic, a variable differentiating circuit has been introduced to add a correction voltage at the input to the Multiplier Driver. This circuit is illustrated in the upper left quadrant of FIG. 7. In effect, the correction voltage lowers the input control ramp to the multiplier by varying amounts to make up for the characteristic lag.

Before studying the circuitry used, consider first the theory involved. In a simple differentiating circuit wherein the input passes through a capacitor C and a resistor R connects the output side of the capacitor to ground, a ramp applied to the input develops a direct current output voltage proportional to the slope of the ramp and having a magnitude proportional to the product RC. The time it takes for the differentiating circuit to reach steady-state is determined by the values of R and C. When one supplies an amplifier having an input resistance $R_{in}$ and a feedback resistance $R_f$, the gain of the amplifier will be determined by the ratio $R_f/R_{in}$. Thus, if one considers the input resistance $R_{in}$ as the resistance element of a differentiating network, and attempts to increase the time of voltage build-up by increasing $R_{in}$, the gain of the amplifier will simultaneously decrease. In other words, varying the resistance value when it is the input to an amplifier as well as part of a differentiating circuit, has primarily the result of effecting a time lag only. On the other hand, varying the capacitance of a differentiating circuit on the input of an amplifier will modify both time lag and voltage amplitude. Thus, varying the capacitors alone in such a situation will cause an increase in the output voltage.

Figure 7:
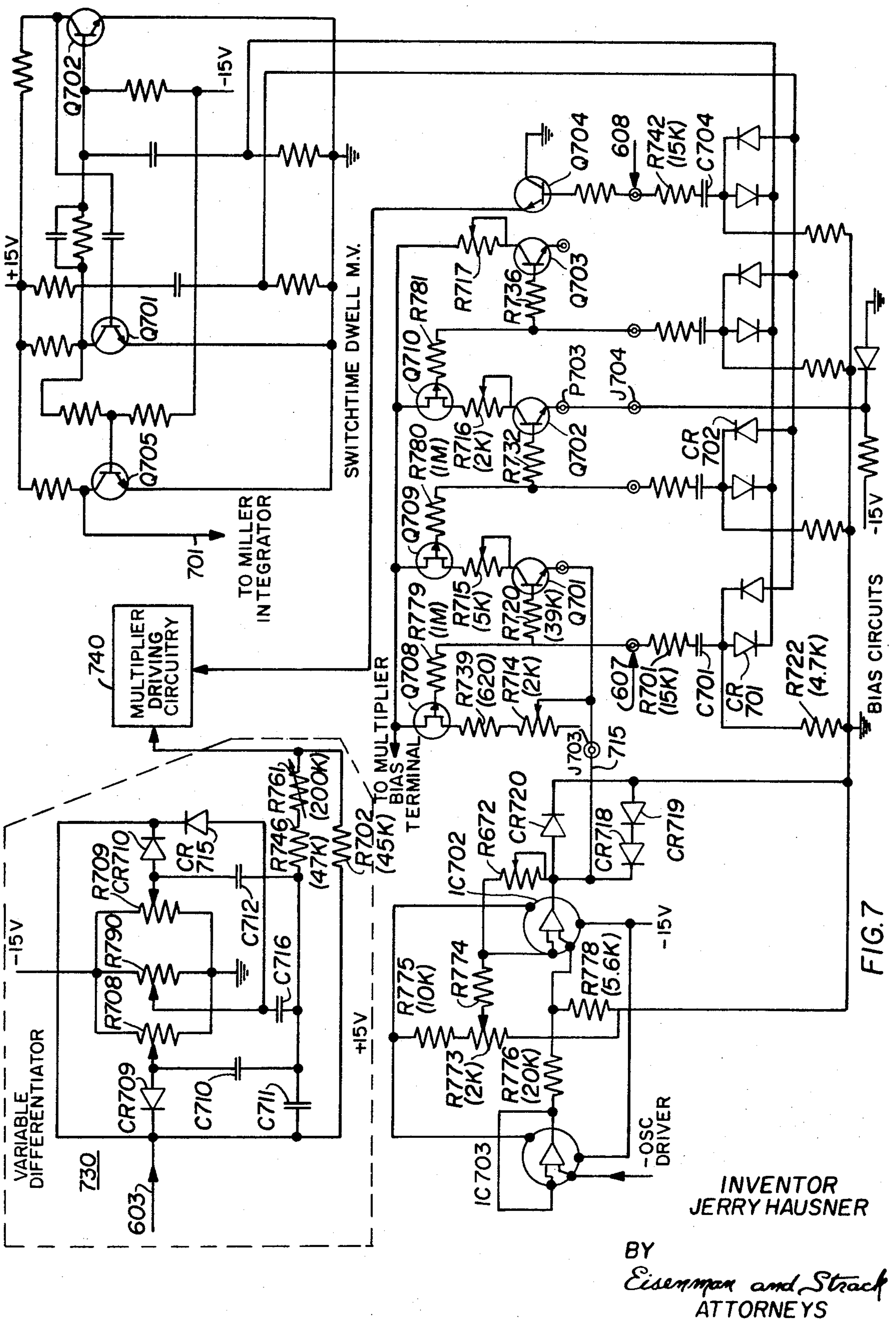
FIG. 7 is a combined block and circuit schematic diagram illustrating a multiplier control section in a frequency sweep generator embodying the features of the present invention.

In the embodiment shown in FIG. 7, a Variable Differentiating Circuit 730 is connected to the input of Multiplier Driving Circuitry 740. Capacitors C711, C710, C716, and C712 are arranged to be selectively connected in parallel to increase the capacitance as the sweep speed increases. The point at which each connection is made is determined by clamping diodes CR709, CR710, and CR715, and potentiometers R708, R790, and R709.

The input of the Multiplier Driving Circuit 740, is the negative ramp voltage from Two Volt Shifter 600, on lead 603, varying from −3.000 Volts to −14.400 Volts. This is applied via resistor R702. An additional input path includes Capacitor C711 and Resistors R746 and R761 in series, with the latter resistor being adjustable.

The capacitors are each arranged for parallel connection to Capacitor C711, as required.

For example, potentiometer R708 is connected between a negative supply voltage and ground. The slide of potentiometer 708 is connected to a junction with the anode of diode CR709 and one side of Capacitor C710. The other side of Capacitor C710 is connected to the junction between Capacitor C711 and Resistor R746. The cathode of diode CR709 is connected to input lead 603. Clearly, the input ramp is blocked by diode CR709 until it descends below the voltage established by the setting of potentiometer R708. Thereafter, it has a path to the Multiplier Driving Circuitry via Capacitor C710 in parallel with Capacitor C711. The point at which each capacitor is connected is determined by the setting of potentiometers R708, R790, and R709. The values of capacitors C710, C711, C712, and C716 are selected to provide the best operation with each Multiplier Circuit. It will be found that no correction is required at the beginning of a sweep, because there has been no time lag at that point; however, the correction voltage required increases as the sweep proceeds.

BIAS CONTROL CIRCUITRY

In order to obtain the optimum performance from the Frequency Multiplier, the step recovery diode therein should preferably be biased at the higher harmonics so that it sees a higher impedance, in order to generate the maximum possible harmonic power. However, it must also see an impedance which does not cause it to oscillate and generate unrelated frequencies. To accomplish this, a switchable bias circuit has been developed to present a different resistance to the step recovery diode as each harmonic is used. The Bias Control Circuitry appears in FIG. 7.

When sweeping the seventh harmonic, Resistors R739 and R714 in series are used; during the fifth harmonic sweep, Resistor R–715 is used; during the third harmonic sweep, Resistor R716 is used; and during the second harmonic sweep, Resistor R717 is used. In order to provide independent adjustment of the resistances for each harmonic, transistor switches are incorporated to switch in and switch out the unrelated resistors as the unit switches harmonics under control of the Comparator outputs, e.g., on lead 607. Thus, when in the seventh harmonic, FET transistors Q708, Q709, and Q710 are all turned on and NPN transistors Q701, Q702, and Q703, are all turned off. In seventh harmonic operation, the only resistance path from the Multiplier bias terminal to its reference is through Resistors R739 and R714. When the unit switches to fifth harmonic operation, transistor Q708 is turned off and and transistor Q701 is turned on. The only path then is through Resistor R715. When switching to third harmonic operation, transistor Q709 is turned off and transistor Q702 is turned on; thereby providing the bias resistance path through Resistor R716. When switching to second harmonic operation, transistor Q710 is turned off and transistor Q703 is turned on providing the path through Resistor R717.

It has also been discovered that for operation with higher order harmonics it is preferable to have a high impedance or low bias current flowing through the step recovery diode at the high frequency end of the harmonic range, in order to obtain the maximum power output. Unfortunately, such a high impedance may cause spurious oscillation at the low frequency end of the harmonic range. To handle this problem, the circuitry at the lower left of FIG. 7 was developed. This circuit produces a bias tracking voltage which follows the frequency of the oscillator. In a particular embodiment, the voltage produced was approximately −1.5 Volts at the low end of the harmonic and varied up to zero Volts at the high end of the harmonic. By inserting this voltage in series with the resistance for each harmonic, the current which flows through the step recovery diode will be higher at the low end of the harmonic than it is at the high end, thus giving the effect of an increasing resistance as the harmonic is swept up the frequency.

The bias tracking circuit is inserted between the higher order harmonic biasing resistors and ground via lead 715. It comprises Integrated Circuit Amplifier IC702, Buffer Amplifier IC703, and their associated circuitry. At the low end of the harmonic range, this voltage source produces an output of −1.5 Volts. Therefore, the bias current is equal to the voltage generated by the step recovery diode from R.F. rectification, plus the magnitude of this voltage source, divided by the bias resistance. This results in a greater bias current than in the first case, giving an apparent lower bias resistance. As the high end of the harmonic range is approached, Amplifier IC702 reduces the voltage to approximately zero volts, thereby leaving the bias current to be determined by the voltage generated by the step recovery diode divided by the bias resistance and this gives an apparent greater resistance.

It has been determined that under all circumstances, the seventh and fifth harmonic ranges benefit from such a bias tracking circuit. Therefore, the return paths for the bias resistances R739 and R714 for the seventh harmonic, and R715 for the fifth harmonic, may be permanently connected to IC702. The second and third harmonics, however, may in some instances operate better under this condition and in other instances under a condition where they are returned to a constant slightly negative bias voltage. A pin connection P703 may be provided in the return path of the third harmonic bias resistance, R716. This pin may then be connected to a jack J703 on lead 715 if tracking bias voltage is required, or to a jack J704 (as shown) if a nonvarying bias voltage is required. Similarly, the second harmonic bias resistance path may be provided with plugs and jack connections.

FREQUENCY SELECTION CIRCUITS

Figure 9:
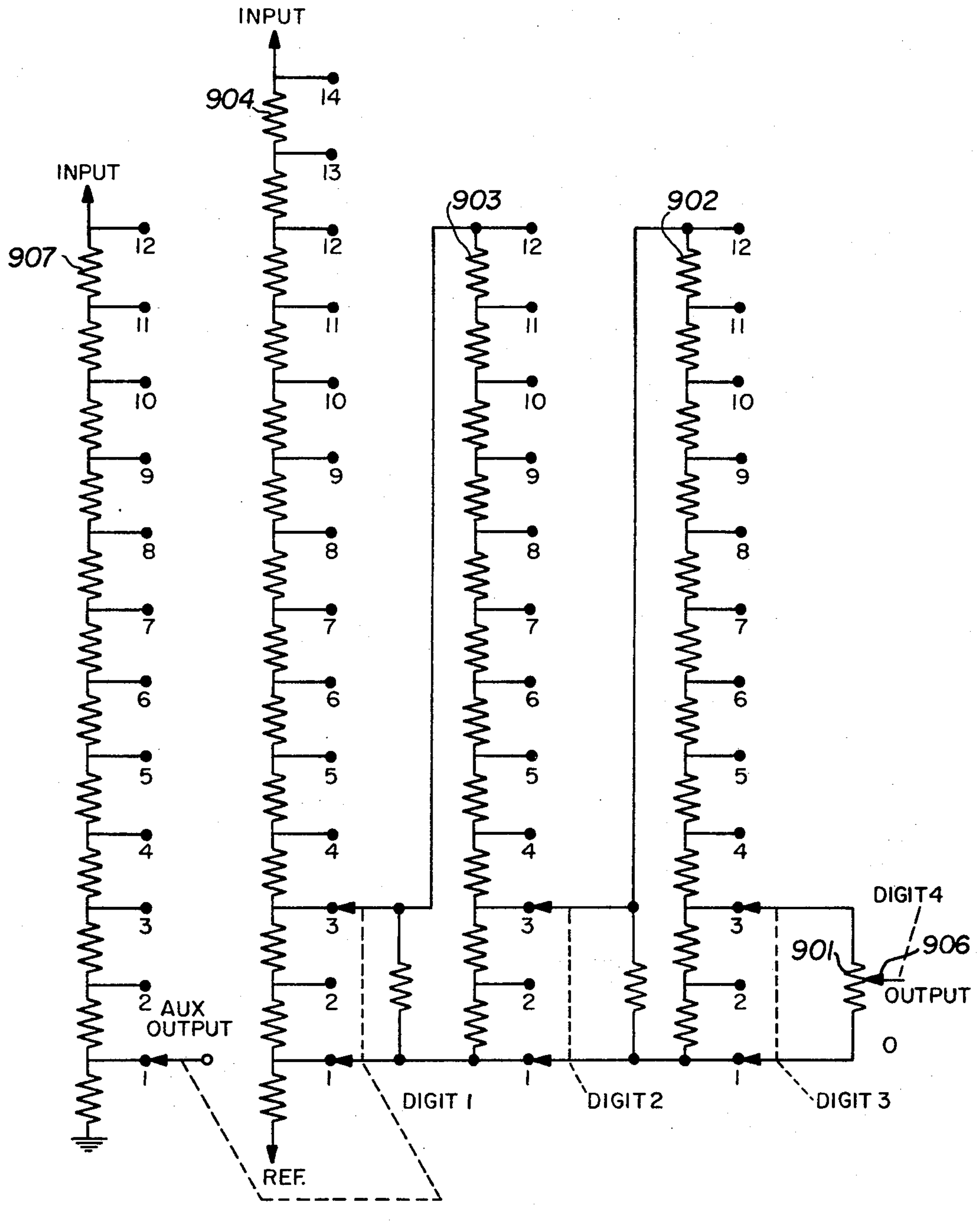
FIG. 9 is a circuit schematic of the digital display counter associated with a frequency selector used in conjunction with the present invention.

The Frequency Selection Indicators 10–13 appearing in FIG. 1, display and control the setting of voltage divider switches. One array of such switches, controlled by the digit wheels 17, 18, 19, 21 of the F1 Digital Frequency Selector 10, for example, is shown in FIG. 9. The three voltage dividers, 904, 903, 902, at the right establish the reference voltages for the three most significant digits of the selected frequency. The adjustable resistance 901, having slide tap 906, establishes the reference voltage for the least significant digit of the selected frequency. It will be noted that the illustrated circuit is a standard Kevin-Varley voltage divider arrangement with a vernier control for the fine voltage selection. The unit, as illustrated, registers a frequency selection of 1.000 GHz. As the slide contacts are moved upward on each divider, the various digits increase in ascending order as shown.

Figure 11:
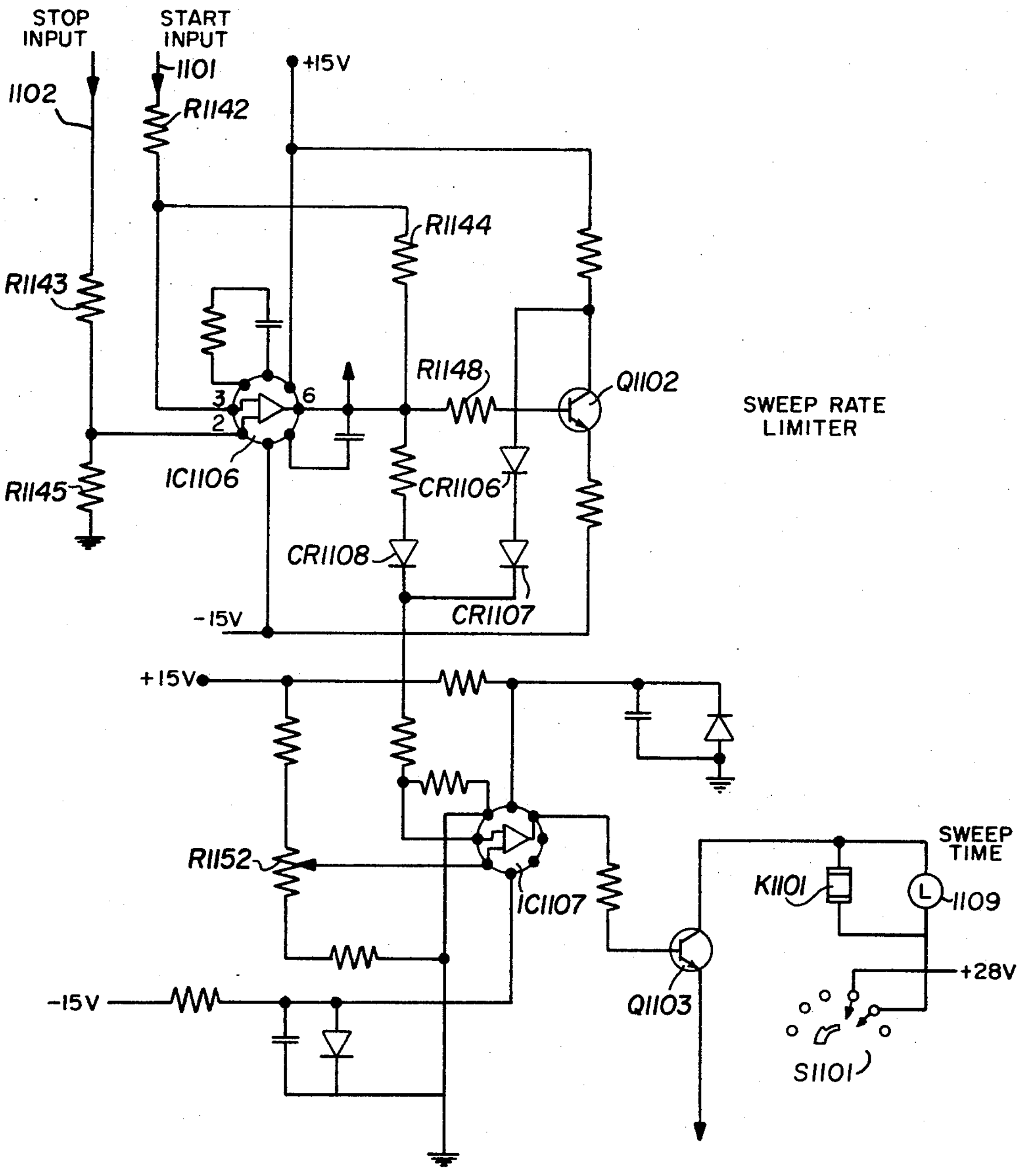
FIG. 11 is a circuit diagram of a sweep rate limiting circuit employed in a frequency sweep generator embodying the features of the present invention.

A fourth voltage divider 907 designated "AUX OUTPUT" is disposed across the left hand portion of FIG. 9. The function of this voltage divider is to insure that the sweep speed selected by the operator of the equipment is not in excess of the tracking capabilities of the Frequency Multiplier. This potential problem has been discussed hereinabove, and may occur when a fast sweep speed is selected and too broad a frequency range is to be swept. When operating in the START/STOP mode, the circuitry shown in FIG. 11 is employed to solve the problem.

Selection of the START/STOP mode is effective, as explained hereinafter, to produce a "start input" voltage on lead 1101 and a "stop input" voltage on lead 1102. These voltages correspond to the voltages for the most significant digit of the selected start and stop frequencies, as determined by the ganged setting of the Auxiliary Voltage Divider 907. For example, if one Frequency Selector is set at 2.000 GHz, the input therefrom would be equivalent to 2.000 Volts. If it is set at 2.600 GHz, the input therefrom would still be equal to 2.000 Volts. It will only change to 3.000 Volts when the first digit is changed to a 3. The two inputs are applied to terminals 2 and 3 of a differential amplifier IC–1106, which subtracts the voltage from the two inputs and produces an output equal to the difference. If the start frequency, for example, is 2.000 GHz and the stop frequency is 6.000 GHz, the output voltage of amplifier IC1102 will be 4.000 Volts. This voltage may be positive or negative, depending upon the direction of sweep. If the sweep is increasing in frequency, the voltage will be positive and if it is decreasing in frequency, the voltage will be negative.

When the sweep is in the direction of increasing frequency, the positive voltage difference appearing at IC1106 output terminal 6 is effective to forward bias diode CR1108. When the output voltage at terminal 6 is negative, CR1108 will be back-biased, and the voltage is applied to the base of transistor Q1102. As shown, this transistor is biased with its collector at +15 Volts and its emitter at −15 Volts. Accordingly, the negative bias applied by the output of amplifier IC1106 tends to cut-off the transistor and drive the collector thereof positive. This in turn forward-biases diodes CR1106 and CR1107. In effect, the configuration of diodes CR1106, CR1107, CR1108, and transistor Q1102 is operative to deliver the output of differential amplifier IC1106 to the succeeding circuitry as a positive signal having a magnitude equal to the difference in the start and stop frequencies. This is applied to Comparator IC1107 which compares the difference voltage with a variable reference voltage obtained from a potentiometer R1152. If the difference voltage is positive with respect to the reference level, the output of Comparator IC1107 is positive. If the difference voltage is negative with respect to the reference level, the output of Comparator IC–1107 is negative. Depending upon these output conditions, a relay K1101 will either be energized or not.

When the output of Comparator IC1107 is positive, it applies a positive bias to the base of a transistor Q1103 which is suitably energized to render it conductive in a series circuit including relay K1101, when the Sweep Time Switch S1101 (Element 33 in FIG. 1) is positioned to select a sweep time within the minimum range of 0.01 seconds. When energized, relay K1101 closes contacts K1101a illustrated in FIG. 8. When the output of Comparator C1107 is negative, there is no appreciable effect upon the operation of either transistor Q1103 or the connected relay K1101. Thus, in order to call operation of relay K1101 into play, the selected sweep range must be beyond an amount determined by the setting of reference level potentiometer R1152, and the selected sweep speed must be within the range 0.01 to 0.1 second. When relay K1101 is operated, a lamp 1109 (lamp 48 in FIG. 1) connected in parallel therewith, will be illuminated.

Figure 8:
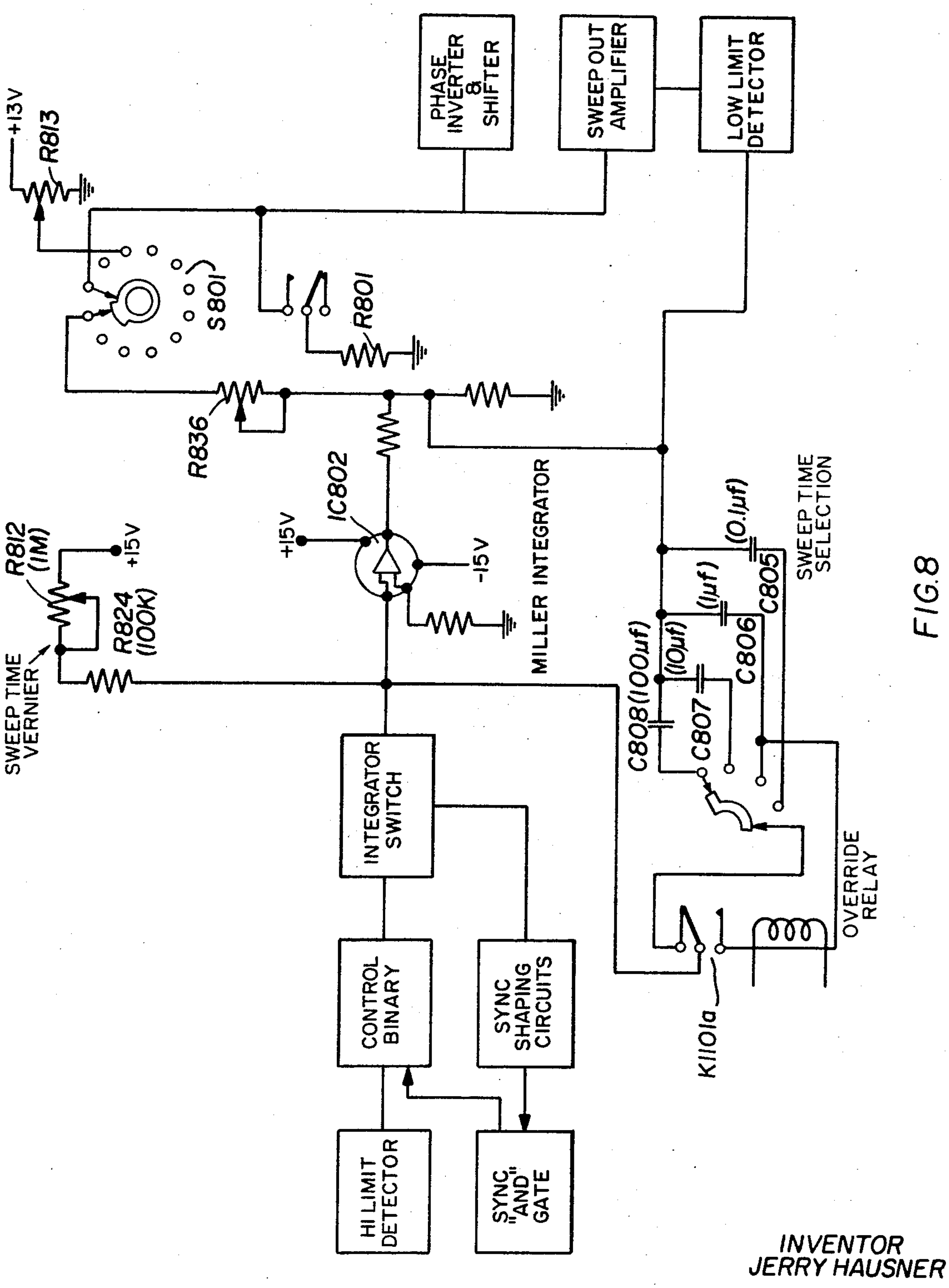
FIG. 8 is a combined block and circuit schematic diagram illustrating the timing section and a portion of the sweep frequency control section of a frequency sweep generator embodying the features of the present invention.

The effect of operating relay K1101 will be apparent from the circuitry of FIG. 8 which controls the charging of the Miller Integrator Sweep Circuit. A second deck of the Sweep Time Switch S1101 appears as S801 in FIG. 8. The lower portion of FIG. 8 reveals the manner in which the sweep is changed by switching in Capacitors C805, C806, C807, and C808, as the Sweep Time Selector is moved up in range. These capacitors appear in a timing circuit including a Resistor R824. Under the special condition when relay K1101 is operated, the contacts K1101a thereof move to replace Capacitor C805 with Capacitor C806 which is, in fact, the one normally utilized for the 0.1 to 1.0 second sweep speed range.

OPERATING MODE SELECTION CIRCUITS

Figure 10A:
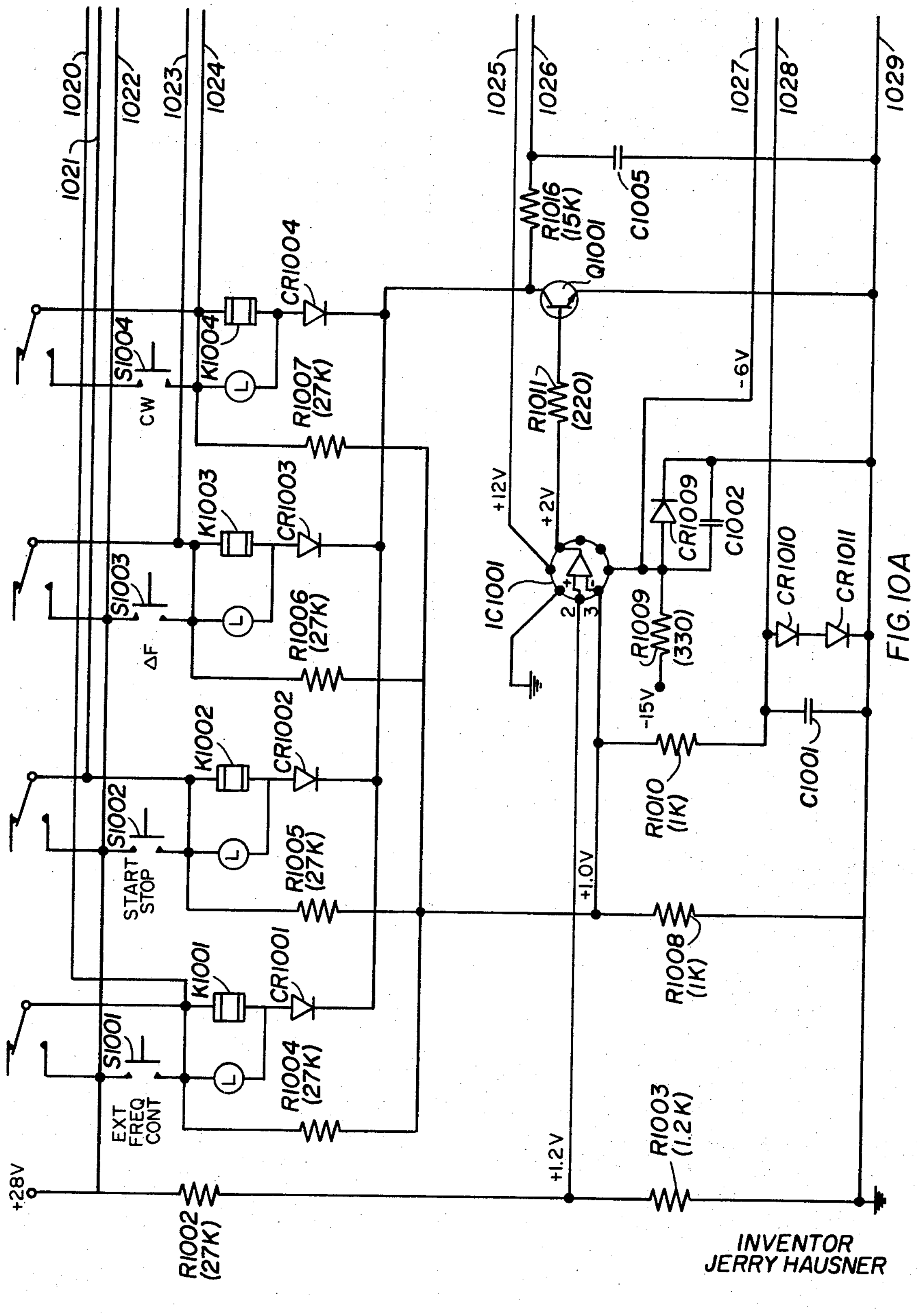
FIGS. 10A and 10B when placed side-by-side constitute a circuit schematic of the function and frequency selection circuitry of a frequency sweep generator embodying the features of the present invention.
Figure 10B:
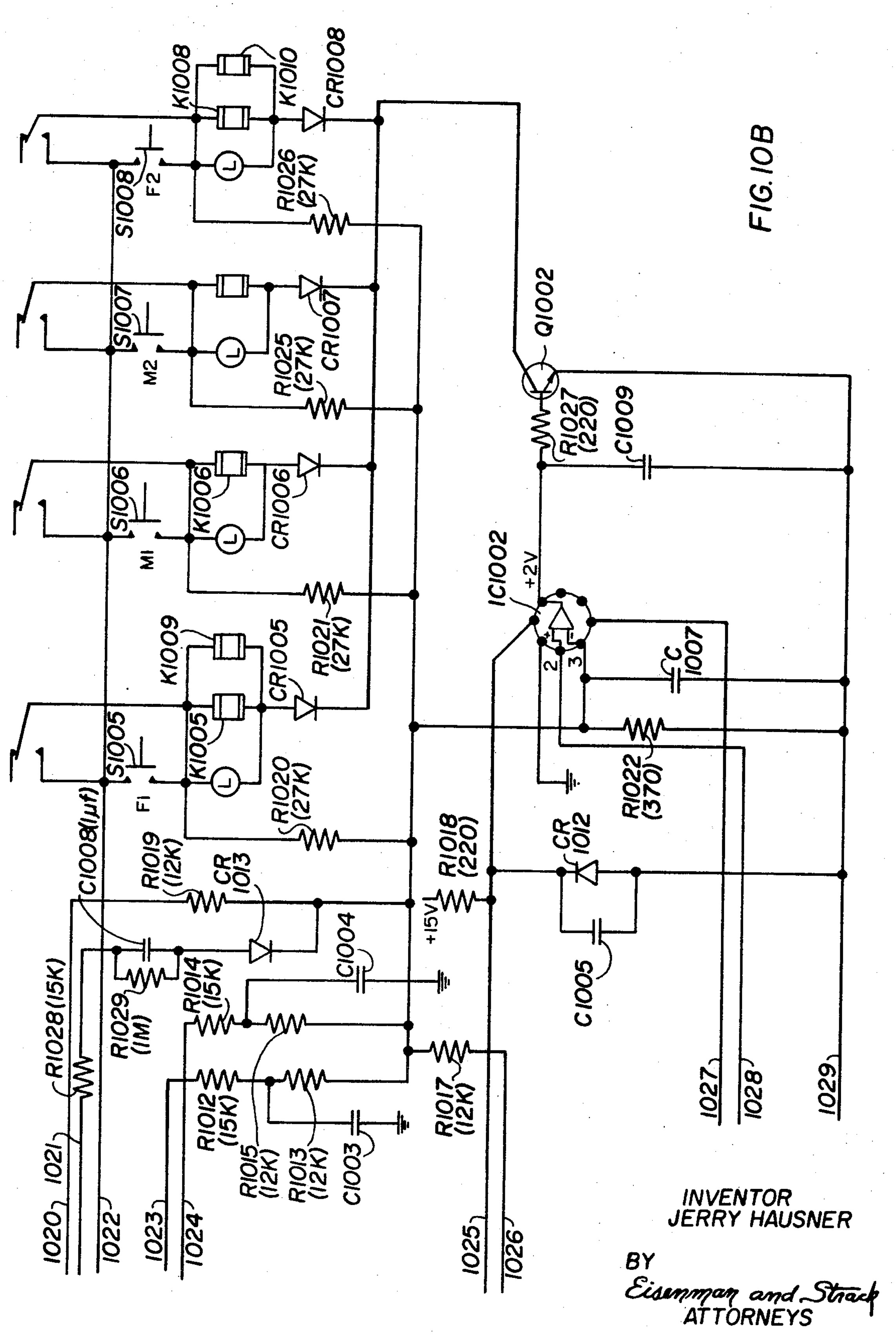

It will be appreciated that the proper functioning of this sweep frequency generating equipment requires that only one function, or operating mode, be selected at any one time. It will be further appreciated that the selection of a function by means of depressing a pushbutton introduces certain time delay problems. Still further, in order to avoid damage to the equipment, it is necessary to guard against the possibility that someone, either intentionally or inadvertently, tries to select two functions at the same time. The circuitry shown in FIG. 10 has been designed to permit the exclusive selection of a single function; this selection being automatically overridden when one makes a second exclusive selection.

Applicant's copending application, Ser. No. 103,778, filed Jan. 4, 1971, fully describes the details and functioning of the Mode and Frequency Selection Circuits.

A number of specific circuits within a preferred embodiment have been described in detail. In certain instances the values of components in these circuits and the specific voltages supplied have been set forth. It is to be understood that where specific details of voltage and parameter values are used, this has been done in the interest of clarity and modifications in these values within the limits of the operation described, is to be expected from those skilled in the art. All such modifications a may be embraced by the scope of the following claims, is intended to be covered by this invention.

The particular aspects of this disclosure which are believed to contain patentable merit, are set forth with specificity in the attached claims.

What is claimed is:

1. A high frequency sweep generator using oscillating means producing signals sweeping an initial frequency band and multiplier means operative to select harmonics of the frequencies in said initial band to sweep a higher frequency band, comprising means for tuning said oscillating means and multiplier means in response to direct current voltage levels discretely indicative of a frequency desired, means for establishing a plurality of voltage levels, first means for selecting one of said voltage levels for tuning said generator to the single frequency corresponding thereto, second means for selecting one of said voltage levels for tuning said generator to sweep a frequency band centered on the frequency corresponding thereto, and means for selecting two of said voltage levels for tuning said generator to sweep a frequency band between the frequencies corresponding thereto.

2. A high frequency sweep generator as defined in claim 1, wherein the means for establishing each of said plurality of voltages comprises a plurality of interconnected voltage dividers each representative of successive decimal digits and each operative to yield a voltage output commensurate in magnitude with the relative weight of the decimal digit represented, and means connected to the voltage divider representing the least significant digit of said successive decimal digits for producing an analog range of voltages between the magnitude established by the voltage difference between each integer of said least significant digit.

3. A high frequency sweep generator as defined in claim 2, wherein each of said voltage dividers is controlled by an indexed device having one step for each decimal digit selected, said device including display means for visually presenting a written digit corresponding to the digit represented by the voltage output selected.

4. A high frequency sweep generator as defined in claim 1, including amplification means connected between said oscillating means and said multiplier means, comprising a first 90° hybrid coupling means supplied by the output of said oscillating means, first amplifying means supplied by the in-phase output of said first coupling means, second amplifying means supplied by the 90° phase shifted output of said first coupling means, and a second 90° hybrid coupling means receiving as two inputs the outputs of said first and second amplifying means.

5. A high frequency sweep generator as defined in claim 4, wherein said first and second amplifying means have closely matched characteristics.

6. A high frequency sweep generator as defined in claim 1, including coupling means between said oscillating means and said multiplier means operative for coupling the signals of said oscillating means directly to an output when frequencies within said initial band are selected and for coupling said signals through said multiplier means to said output when frequencies above said initial band are selected.

7. A high frequency sweep generator as defined in claim 6, wherein said coupling means includes a coupler having two coupler outputs and a combiner having two inputs and producing said output, one coupler output being connected to said multiplier means and the other coupler output being connected to one of said combiner inputs, the other of said combiner inputs being connected to the output of said multiplier means, and means for switching the input of said coupler to either the first or second coupler output in accordance with the frequencies selected.

8. A high frequency sweep generator as defined in claim 1, including means for generating a control ramp voltage for tuning said oscillating means and said multiplier means across a frequency band, comparator means for comparing said ramp voltage with a plurality of references to produce outputs establishing switch-over frequencies at which selected harmonics of the frequencies in the initial band will be used, means responsive to said outputs for resetting said oscillating means to produce the initial frequency corresponding to the selected harmonic frequency, and blanking means responsive to said outputs to inhibit all frequency sweeping during reset of said oscillating means.

9. A high frequency sweep generator as defined in claim 8, wherein said turning ramp voltage is produced by integrating circuit means in response to a constant direct current voltage, and wherein said blanking means produces said constant direct current voltage except when triggered to a second stage for a preselected period of time by said outputs of the comparator means.

10. A high frequency sweep generator as defined in claim 1, wherein said multiplier means is operative to sweep a high band of harmonic frequencies in synchronism with the sweep of said initial band of frequencies, under control of a basic control voltage ramp, including comparator means for adding a correction voltage to the basic control voltage for use in sweeping said multiplier means.

11. A high frequency sweep generator as defined in claim 10, wherein said compensating means comprises a variable differentiating circuit connected to the input of said multiplier means and automatically operative to increase the capacitance thereof as the magnitude of said control voltage increases.

12. A high frequency sweep generator as defined in claim 11, wherein said differentiating circuit comprises a plurality of series circuits including capacitors and diodes connected in parallel with the basic capacitor of said differentiating circuit, and means for adjustably biasing each of said diodes to conduct at preselected levels of said control voltage.

13. A high frequency sweep generator as defined in claim 1, wherein said multiplier means employs a step recovery diode, comprising a switchable bias circuit for said diode operative to present different resistance values for different harmonic ranges.

14. A high frequency sweep generator as defined in claim 13, wherein said multiplier means is tuned across a frequency band including several harmonics of said initial band under control of a ramp voltage; and wherein there is included comparator means for comparing said ramp voltage with a plurality of references to produce outputs establishing the switch-over frequencies at which successive harmonic ranges are selected; said bias circuit comprising a plurality of impedances, each controlled by an individual switching means, each said switching means being responsive to one of said comparator outputs to connect the associated impedance into the bias circuit as successive harmonic ranges are selected.

15. A high frequency sweep generator as defined in claim 14, wherein said impedances are serially connected to a variable voltage supply having a magnitude which varies throughout the range selected for individual harmonics.

16. A high frequency sweep generator as defined in claim 15, including means for selectively connecting bias impedances associated with some harmonic ranges to said variable voltage supply and means for selectively connecting bias impedances associated with other harmonic ranges to a constant voltage.

17. A high frequency sweep generator as defined in claim 1, including means for generating a control ramp voltage for sweeping said oscillating means and said multiplier means across their respective frequency bands, means for manually selecting the speed of said sweep by modifying the slope of said control ramp voltage, and means for automatically over-riding the speed selection and using a lower speed when the frequency limits of the selected band are in excess of a predetermined amount.

* * * * *

UNITED STATES PATENT OFFICE
CERTIFICATE OF CORRECTION

Patent No. 3,706,940 Dated December 19, 1972

Inventor(s) Jerry Hausner

It is certified that error appears in the above-identified patent and that said Letters Patent are hereby corrected as shown below:

| | |
|---|---|
| Column 3, line 35 | Change "described" to --describe-- |
| Column 4, line 41 | Change "nd" to --and-- |
| Column 8, line 11 | Change "sample" to --samples-- |
| Column 18, line 53 | Change "a" to --as-- |
| Column 20, line 14 | Change "stage" to --state-- |

Signed and sealed this 1st day of May 1973.

(SEAL)
Attest:

EDWARD M. FLETCHER, JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334

Disclaimer 3,706,940.—*Jerry Hausner,* Flushing, N.Y. HIGH FREQUENCY SWEEP GENERATOR. Patent dated Dec. 19, 1972. Disclaimer filed Apr. 13, 1981, by the assignee, *The Narda Microwave Corp.*

Hereby enters this disclaimer to claims 1, 4, 5 and 17 of said patent.

[*Official Gazette July 14, 1981.*]